United States Patent
Löcker (10) Patent No.: US 10,265,755 B2
(45) Date of Patent: Apr. 23, 2019

(54) METHOD FOR PRODUCING A PRESS-HARDENED MOLDED PART, AND PRESS-HARDENING TOOL

(75) Inventor: Markus Löcker, Finnentrop (DE)

(73) Assignee: KIRCHHOFF AUTOMOTIVE DEUTSCHLAND GMBH, Attendorn (DE)

( * ) Notice: Subject to any disclaimer, the term of this patent is extended or adjusted under 35 U.S.C. 154(b) by 0 days.

(21) Appl. No.: 14/237,385

(22) PCT Filed: Aug. 27, 2012

(86) PCT No.: PCT/EP2012/066613
§ 371 (c)(1),
(2), (4) Date: Feb. 6, 2014

(87) PCT Pub. No.: WO2013/030157
PCT Pub. Date: Mar. 7, 2013

(65) Prior Publication Data
US 2014/0190234 A1  Jul. 10, 2014

(30) Foreign Application Priority Data
Aug. 30, 2011 (DE) .......... 10 2011 053 118

(51) Int. Cl.
*C21D 8/02* (2006.01)
*B21D 22/20* (2006.01)
(Continued)

(52) U.S. Cl.
CPC .......... *B21D 22/208* (2013.01); *B62D 25/04* (2013.01); *B62D 29/007* (2013.01); *C21D 1/673* (2013.01);
(Continued)

(58) Field of Classification Search
CPC ...... B21D 22/208; B21D 37/16; B21D 22/06; B21D 22/22; B21D 22/022; B21D 37/08;
(Continued)

(56) References Cited

U.S. PATENT DOCUMENTS 5,546,784 A * 8/1996 Haas ............... B21D 37/02
72/413
5,916,389 A 6/1999 Lundstrom
(Continued)

FOREIGN PATENT DOCUMENTS

DE      2718970 A1    11/1977
DE    197 23 655 A1   12/1997
(Continued)

OTHER PUBLICATIONS

Opposition filed Mar. 19, 2013 in related application DE 10 2011 053 118 B3, filed Aug. 30, 2011.
(Continued)

*Primary Examiner* — Gregory D Swiatocha
(74) *Attorney, Agent, or Firm* — Polson Intellectual Property Law P.C.; Christopher R. Sylvain; Margaret Polson (57) ABSTRACT

A method to produce a molded part having at least two regions of different strength using a press-hardening tool. A heated blank is formed in the tool during a forming step and held therein for heat-treating during a cooling step. At least one region of lower strength is cooled more slowly than at least one region of higher strength. During the forming step, the entire blank is in contact with a molding surface of the tool. Then, the tool surface is changed such that one or more regions of lower strength have no tool contact during the cooling step. The tool surface associated with the one or more regions of lower strength is provided by tool segments that are adjustable relative to the remaining tool surface. The (Continued)

molding surface of the one or more tool segments is larger than the region of lower strength associated with such tool segment.

11 Claims, 5 Drawing Sheets

(51) Int. Cl.
- *B62D 25/04* (2006.01)
- *B62D 29/00* (2006.01)
- *C21D 1/673* (2006.01)

(52) U.S. Cl.
CPC ....... *C21D 8/0294* (2013.01); *C21D 2221/10* (2013.01)

(58) Field of Classification Search
CPC ........ B21D 22/24; B21D 24/21; C21D 1/673; C21D 8/04; C21D 2241/00; C21D 8/0294; C21D 9/48; C21D 1/19; C21D 2221/10
USPC ........... 72/342.1–342.96, 364, 348; 148/643, 148/644, 647, 654
See application file for complete search history.

(56) References Cited

U.S. PATENT DOCUMENTS

| | | | |
|---|---|---|---|
| 6,354,561 B1 * | 3/2002 | Fahrion | B22C 9/06 249/155 |
| 6,461,544 B1 | 10/2002 | Waitts | |
| 6,745,609 B2 | 6/2004 | Garnett et al. | |
| 7,080,539 B2 | 7/2006 | Parker | |
| 7,523,635 B2 | 4/2009 | Ono | |
| 7,762,114 B2 | 6/2010 | Abney et al. | |
| 8,117,878 B1 | 2/2012 | Popiolkowski et al. | |
| 8,273,103 B2 | 9/2012 | Waeschle | |
| 8,567,226 B2 | 10/2013 | Morales | |
| 8,966,763 B1 * | 3/2015 | Heck | B25B 1/2415 219/656 |
| 2006/0236741 A1 * | 10/2006 | Saitou | B21D 53/26 72/348 |
| 2007/0105491 A1 | 5/2007 | Walsh et al. | |
| 2012/0186705 A1 | 7/2012 | Sikora et al. | |
| 2013/0180633 A1 * | 7/2013 | Lee | B21D 22/208 148/643 |
| 2013/0205863 A1 * | 8/2013 | Loesch | 72/342.7 |

FOREIGN PATENT DOCUMENTS

| | | |
|---|---|---|
| DE | 202008016877 U1 | 3/2009 |
| DE | 102009043926 A1 | 3/2011 |
| DE | 10 2010 0027554 A1 | 1/2012 |
| EP | 1180470 B1 | 2/2002 |
| JP | 60184428 A | 9/1985 |
| WO | 2006038868 A1 | 4/2006 |
| WO | 2012010418 A1 | 1/2012 |
| WO | WO 2012/091346 * | 7/2012 |

OTHER PUBLICATIONS

Written Opinion of the International Searching Authority, related case PCT/EP2012/066613.
International Preliminary Report on Patentability, ch. II, related case PCT/EP2012/066613.
International Search Report of the International Searching Authority, related case PCT/EP2012/066613.
Office action dated May 23, 20216 in related European application 12758814.3.

* cited by examiner

METHOD FOR PRODUCING A PRESS-HARDENED MOLDED PART, AND PRESS-HARDENING TOOL

BACKGROUND

The present disclosure relates to a method for producing a press-hardened molded part having at least two regions that differ regarding their strength, including at least one region of lower strength and at least one region of higher strength. This is accomplished by means of a press-hardening tool in which a blank, which has been heated to a forming temperature, is formed and held in the tool for the purpose of heat treating. To adjust the strength, at least one region of lower strength is cooled slower as compared to the regions that are to have higher strength. The present disclosure furthermore relates to a press-hardening tool with a forming surface for producing a press-hardened molded part having at least two regions that differ regarding their strength.

Press-hardening tools are tools for forming and hardening metal blanks. For the purposes of hardening, depending on the configuration of the method, an appropriately preheated blank is fed into the press-hardening tool in which it is formed and then sufficiently quickly cooled and thus hardened after the forming has been completed. Such press-hardening tools for example are used for producing structural components of motor vehicles. The blanks are normally steel sheet blanks.

There are numerous applications in which a structural component for a motor vehicle with different mechanical properties is desired. Such structural component can be the B-pillar of a motor vehicle, for example. For a B-pillar, it is sometimes desired for the column to have less strength in the region of the base and thus increased ductility, compared to the connecting regions of higher strength and a correspondingly lower ductility.

Such a B-pillar is known from EP 1 180 470 B1, which for the purpose of adjusting the different strengths is differently heated in regions prior to introducing the blank. For this purpose, those regions of the blank in which the formed molding must have increased strength are heated to a higher temperature than those which must have lower mechanical strength properties. The method known from EP 1 180 470 B1 uses a steel blank in which the regions of higher strength in the molded part, i.e. the B-pillar, is heated to austenitizing temperature, while those regions of the blank corresponding to the regions of the formed molded part of lower strength are only heated to a temperature which is distinctly below the austenitizing temperature. In order to protect the regions that are to be heated to a lower temperature, EP 1 180 470 B1 proposes to insulate these regions. It has been shown, however, that this manner of handling the blanks is complicated. At the same time, it must be recognized that a certain amount of lack of definition of the dimensional accuracy in the delimitation of the regions of higher strength has to be accepted.

WO 2006/038868 A1 discloses an additional method for producing press-hardened moldings with regions of different strength. In this method, the tool design is configured such that those regions of the blank to be provided with a lower strength are located in a tool cavity. To hold the molded part in the tool in the regions of lower strength, support structures are incorporated into the cavity, which are supported on the molded part. The contact area between the molding surface of the tool and the molded part within such cavity amounts to less than 25% of the surface area. It is possible to produce structural components having regions of different strength using the method and the press-hardening tool described in this document, wherein the blank was previously heated uniformly to its forming temperature. However, the dimensional accuracy of the molded parts produced with this method and/or with this tool is frequently not sufficient. Especially with structural components in which seals are to be used, as is the case with a B-pillar, for example, the molded parts produced with this method do not meet the necessary tolerance requirements. In the methods known from the prior art, those regions of the molding are moreover limited with respect to their size which have a lower strength throughout, since regions of higher strengths are formed in the contact areas.

SUMMARY

Based upon the discussed prior art, an aspect of the present disclosure therefore is to develop a method named at the outset as well as a press-hardening tool named at the outset in such a manner that the advantages in handling of the method known from WO 2006/038868 A1 can be realized, wherein the dimensional accuracy of the molded parts produced is improved, the limitations regarding the size of the regions of lower strength do not have to be contended with, and no losses in the surface quality have to be accepted.

In the previously described method, a press-hardening tool is used where the tool surface can be changed. The changeability of the tool surface of the tool, i.e. of the surface that is abutted by the blank and/or by the formed molded part, relates to its contact area with the molded part. The blank to be formed and/or the formed molding abut a closed tool surface during the forming step. The tool surface is then changed subsequent to the forming step to adjust the regions of different strengths during a cooling step. Namely the effective tool surface, which abuts regions of the molding to be adjusted with lower strength for the forming step, is retracted from the molded part surface in the regions of the lower strength during the cooling step. Consequently, these molding surface regions do not, or at least temporarily do not, abut against the tool surface during the cooling step. As the tool is cooled, the cooling process in those sections of the molded part that are not abutting the tool surface is distinctly slower than in the other tool regions. With this concept, a specific cooling rate must be adhered to for adjusting regions of the molded part with higher strength. This cannot be achieved in those regions in which no tool surface abuts against the molding surface during the cooling process. This is why these regions are not being hardened and thus have lower mechanical strength properties. In the above-described concept, it has thus been ensured that the cooling process can be performed selectively in the different molded part regions. In those regions in which a lower strength is desired, the contact time of the molding with the one or more tool segments is reduced during the cooling process compared to the molded part regions in which a higher strength is desired. This does not mean that these molded part regions of lower strength must not have any contact with the tool segment during the entire cooling process. What is decisive is that the tool segments that abut the molded part surface in the molded part regions of lower strength during the forming process are controlled such that the cooling rate of those molded part regions is reduced compared to the other regions of the molded part. In addition to the option to leave the one or more tool segments retracted from the molded part regions of lower strength during the entire cooling process, it is also possible to retract them intermittently against these molded part regions once or even multiple times. This makes it possible to influence the cooling rate. In addition, such a measure assists the dimensional accuracy of these molded part regions. In addition, or even in place of the single or multiple retraction of the one or more tool segments against the molded part surface during the cooling process, the molded part regions of lower strength can also be calibrated in the described manner after the cooling process has been completed.

The molding surface of the at least one tool segment abutting the molded part for the forming process is larger than the corresponding region of the molded part to be adjusted with lower strength via these tool segments. In this embodiment, the molding surface of the at least one tool segment is not only assigned to the actual region of the molded part having lower strength during the forming process, but also at least partially to the connecting transition regions in those regions of the molded part with higher strength. This concept permits the press-hardening tool to be configured such that the tool segments can be arranged adjacent to each other, leaving no gaps. This is essential to prevent tool imprints from being formed on the upper side of the molded part in the course of the forming process.

Since the full surface of the blank abuts against a tool surface during the forming step, and this is maintained right up to the end or at least until shortly before the forming step is completed, the particular dimensional accuracy of molded parts produced with this method and also with such press-hardening tool is achieved.

The handling of such a press-hardening tool is uncomplicated and can also be controlled automatically. The tool surface regions which abut regions of lower strength of the blank and/or the molded part during the forming step are typically formed by tool segments that are moved like slides, for example. Such process can be performed fully automatically. It is particularly not required to heat a blank differently across different regions before it is formed.

As a result of changing the effective tool surface between the forming step and the cooling step, this will not only ensure a particularly high dimensional accuracy in the final geometry of the molded part, but also acute and especially repeatable reciprocal delimitation of the regions of different strength, and process stability.

This method and the described press-hardening tool can be used particularly advantageously for the press-hardening of sheet steel blanks. In such case, the blank is brought to its austenitizing temperature before it is fed to the press-hardening tool for the purposes of forming and its partial hardening.

A particular advantage with the method and with the pressing tool described is that the same structural component can be produced with regions of different strength or without such regions. Since a change of the tool surface is possible in different regions of the tool surface, by activating or not activating the tool segments it is possible to produce molded parts in which either the total number of the possible regions have a lower strength, one or more of the possible regions have a lower strength, or the entire molded part is hardened uniformly to have a higher strength. This allows the same press-hardening tool to be used to produce molded parts of the same geometry, in which different regions can have a lower hardness compared to other molded parts produced by the same tool.

Pursuant to a further embodiment of a press-hardening tool, the tool surface assigned to the one or more regions of lower strength of the molded part is constructed of a material that has a lower thermal conductivity than the material of the remaining tool surface, such that the cooling rate of the regions of lower strength is less than is required to produce regions with higher strength via the hardening process.

Also with this press-hardening tool, regions of the molded part that are to have a lower strength are cooled more slowly than the remaining regions of the molded part to have a higher strength. With this proposed solution, the one or more tools of the press-hardening tool corresponding to the regions of lower strength are designed to be heat insulated and consequently have material properties comprising low thermal conductivity, which results in slowing down the cooling process. For this reason, the necessary cooling rate to develop a region of higher strength cannot be achieved. These tool surfaces typically involve mold inserts made of a ceramic material, for example. Also with this pressing tool, the molding surfaces of the tool segments act with their full surface on the blank or the molded part, which ensures the high dimensional accuracy of the molded parts produced with this press-hardening tool. Further advantages and embodiments of the invention result from the subsequent description of embodiments, making reference to the enclosed figures, which show the following:

DETAILED DESCRIPTION

Figure 1:
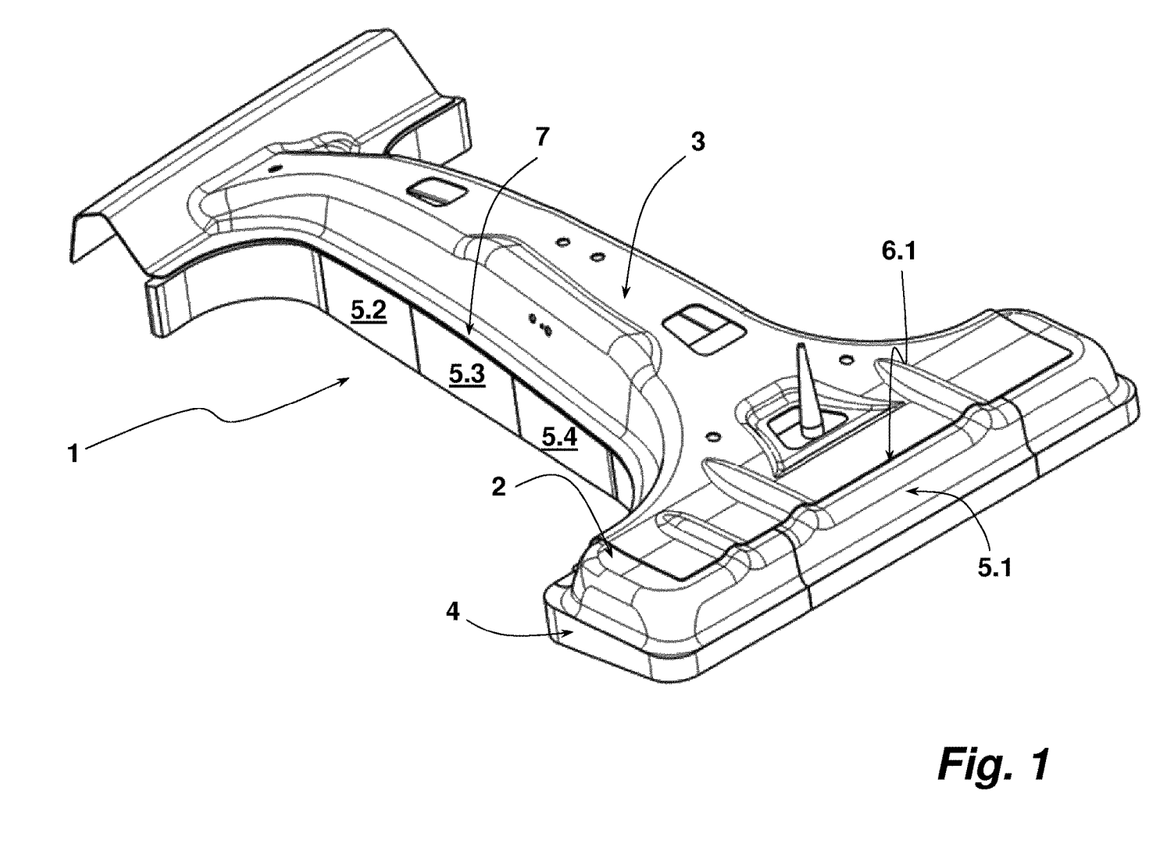
FIG. 1 is a part of a press-hardening tool with its bottom die and an already formed molded part bearing on it, with the bottom die for providing a first tool surface.

FIG. 1 shows the bottom die 1 of a press-hardening tool which is otherwise not illustrated in greater detail. The press-hardening tool has on its molding surface 2 an already formed blank—a molded part 3. The molded part 3 is shown arranged on the molding surface 2 following the forming process. In addition to the bottom die 1, the press-hardening tool also has an upper die, which is not represented in the figures. The upper die is designed in the same manner as the bottom die 1 which is subsequently described in greater detail.

The bottom die 1 is composed of multiple tool components. These include a basic tool body 4. The tool body 4 is cooled in a manner which is not illustrated in greater detail. In addition to the basic tool body 4, the bottom die 1 has multiple tool segments 5.1, 5.2, 5.3 and 5.4, which are adjustable with respect to the basic tool body 4, namely in a manner so that their forming area on the tool segment 5.1, which is marked with the reference symbol 6.1 and faces towards the molded part 3, can be retracted with respect to the molding surface 2 of the basic tool body 4. The tool segment 5.1 is located in the vicinity of the base of the molded part 3; the tool segments 5.2, 5.3 and 5.4 are located in the vicinity of a flange 7. The upper die that is not represented in the figures is partitioned accordingly, so that at the positions opposite the tool segments 5.1-5.4 of the molded part 3, such tool segments are also provided for the upper die that can likewise be retracted and which are shaped complementary with respect to their molding surface.

FIG. 1 shows the molding surface 2 provided by the bottom die 1, said surface being used for forming a steel sheet blank that has been heated to its austenitizing temperature.

The described press-hardening tool with its bottom die 1 and its upper die (not shown) is used for producing a molded part, which in the illustrated embodiment is a B-pillar with regions of different strength for a motor vehicle. The regions of different strength in the molded part 3 are adjusted after the forming step, i.e. only after the bottom die 1 and the upper die have performed their press movement for forming the steel sheet blank. Then the tool segments are retracted from the surface of the molded part 3 in the regions thereof where a lower strength is to be created, which these tool segments were abutting during the forming step. It is to be understood that the press-hardening tool with its bottom die 1 and its upper die is designed such that the tool segments are located in those regions where the areas of lower strength are to be provided on the molded part.

Figure 2:
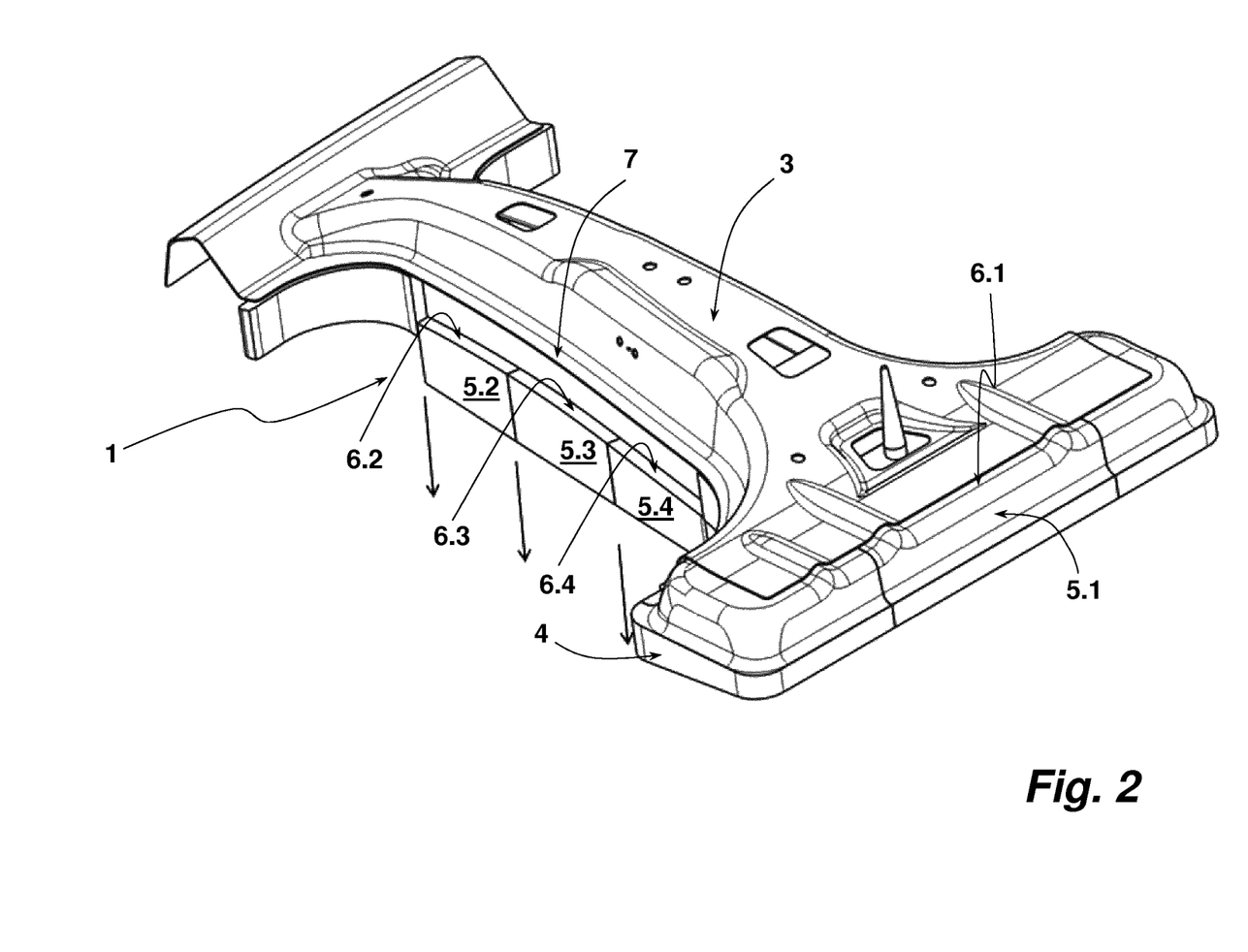
FIG. 2 is the bottom die of FIG. 1 in a second position for providing a tool surface which differs from the tool surface of the position of FIG. 1.

FIG. 2 illustrates a position of the tool segments 5.2, 5.3 and 5.4 which changed the molding surface, so that only a part of the flange 7 of the molded part 3 will be adjusted to a reduced strength. Consequently, the tool segments 5.2, 5.3 and 5.4 with their molding surface 6.2, 6.3, 6.4 are retracted from the respective sections of the flange 7 after the forming step and the tool's surface is changed by retraction of the tool segments 5.2, 5.3 and 5.4 from the surface of the flange 7. This flange section 7 is therefore located within the still closed press-hardening tool in a cavity filled with air. This results in a slower cooling rate for this section of the flange 7 because of the significantly lower thermal conductivity of air compared to the thermal conductivity of the tool steel of the basic tool body 4 and of the tool segment 5.1, which likewise still abuts the molded part 3 with its forming area 6.1 in FIG. 2. The areas of the molded part 3 still bearing against the effective molding surface of the lower part of the tool will be cooled at a rate necessary for the desired hardening process. Therefore, a higher strength is created in these areas of the molded part via cooling in the form of quenching than in those areas of the molded part 3 which do not have any contact with the tool during this cooling step, as is the case in the illustrated embodiment with respect to a part of the flange 7.

Figure 3:
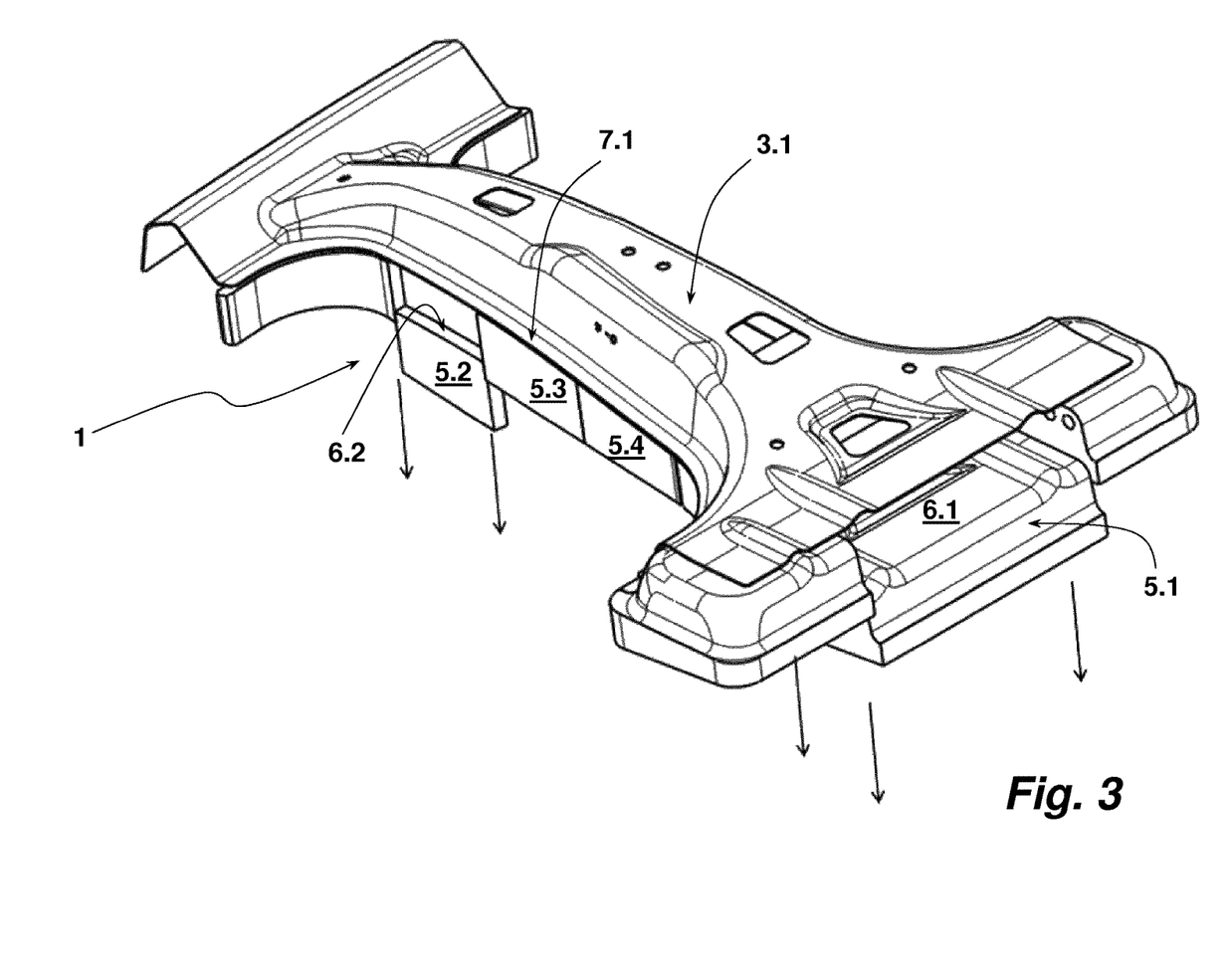
FIG. 3 is the press-hardening tool of FIG. 1 with a further position of its bottom die for providing a different tool surface compared to the tool surface of FIG. 2.

FIG. 3 illustrates the bottom die 1 of the press-hardening tool with another embodiment of the adjustable effective molding surface and part areas of different strength. In contrast to the effective tool surface provided for the cooling step in the embodiment of FIG. 2, the embodiment of FIG. 3 provides to retract the tool segments 5.1 and 5.2 from the surface of the molded part 3.1. Consequently, in this embodiment of the cooling surface of the bottom die 1, a region of lower strength is created in the area of the base of the B-pillar comprising the molded part 3.1, the same as in a short section of the flange 7.1.

With the bottom part of the tool 1, the tool segments 5.1, 5.2, 5.3 and 5.4 are adjustable in the vertical direction relative to the basic tool body 4 as indicated by the arrows in FIGS. 2 and 3, in a manner which is not illustrated in greater detail.

Figure 4:
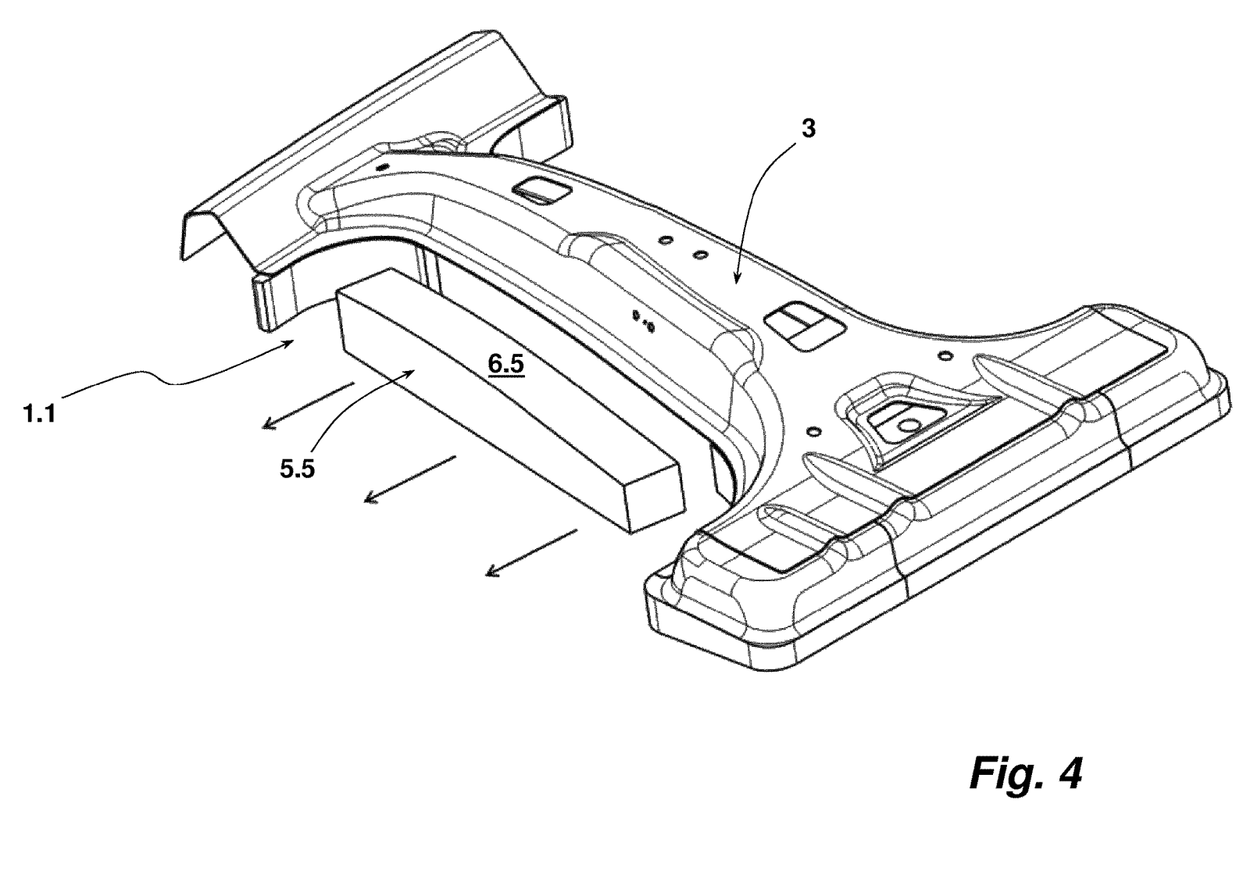
FIG. 4 is a press-hardening tool which is designed in principle as the one of FIG. 1, pursuant to a further embodiment.

FIG. 4 shows a further bottom die 1.1 of a press-hardening tool which is otherwise not illustrated in greater detail. In principle, this is constructed like the bottom die 1 of FIGS. 1 to 3. The bottom die 1.1 differs from what is described above, in that only one tool segment 5.5 is arranged in the area of the flange 7. This can be adjusted in the horizontal direction for the retraction of its forming area 6.5 from the surface of the molded part 3 which bears on the bottom die 1.1.

Figure 5:
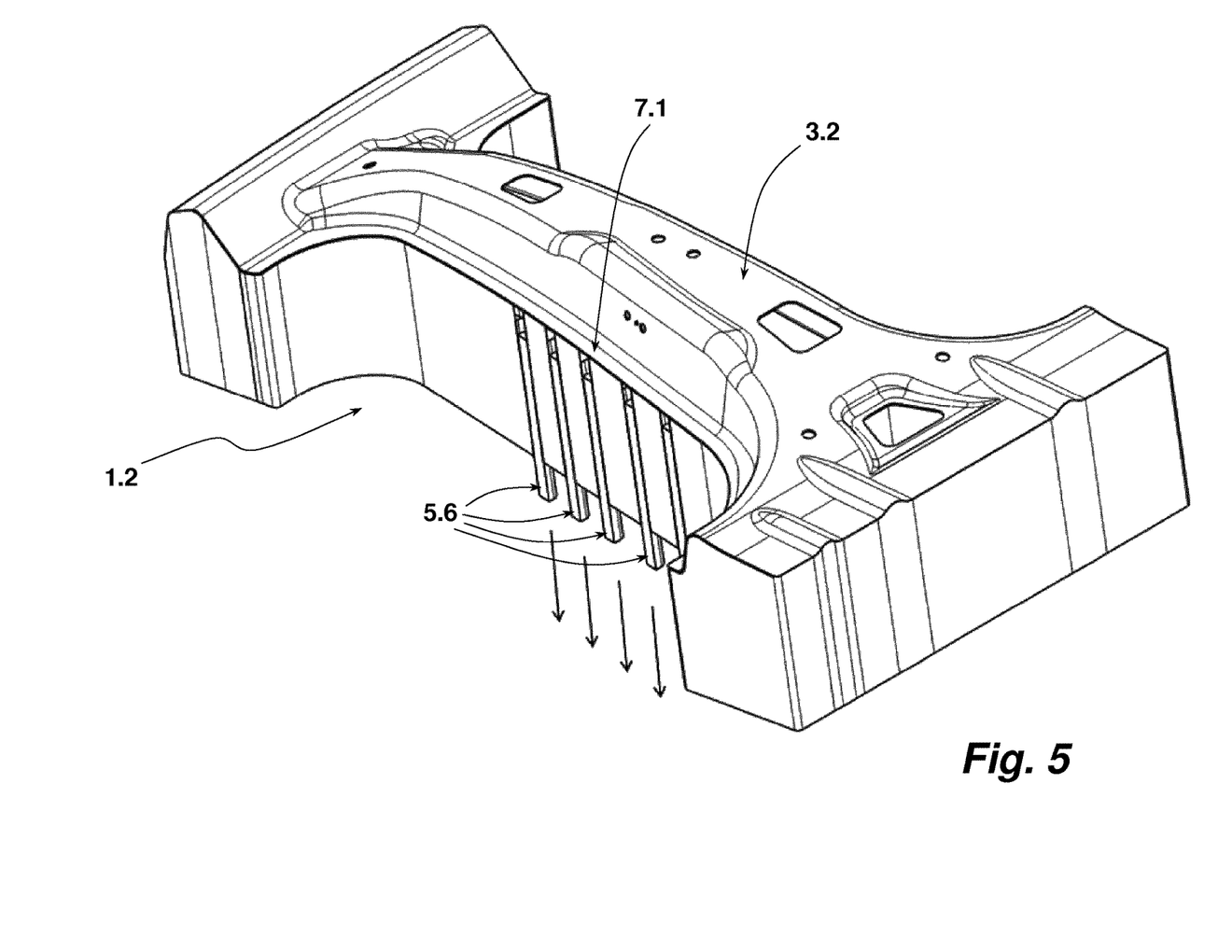
FIG. 5 is a further bottom die of a press-hardening tool.

FIG. 5 shows still a further bottom die 1.2 of a press-hardening tool which is otherwise not illustrated in greater detail. With this bottom die 1.2, only certain regions of reduced strength are created in the area of a flange 7.1, in order to carry out spot welding thereon. For this reason, the bottom die 1.2 has individual tool segments 5.6 at those positions which spot welds are to be performed on the produced molded part 3.2. These are illustrated in FIG. 5 with their forming area retracted from the surface of the molded part 3.2.

Using tools of the type described above, molded parts can be produced in which the regions of higher strength comprise tensile strengths ($R_m$) of 1300 to 1950 MPa and yield points ($R_{p0.2}$) of 950 to 1520 MPa. The regions of reduced or lower strength on the molded part can comprise tensile strengths ($R_m$) from 550 to 750 MPa and yield points ($R_{p0.2}$) of 350 to 600 MPa. It will be appreciated that this data is exemplary only. The property values also depend on the material used for the blank. The exemplary data refer to a molded part made of steel sheet. The difference in the mechanical strength properties makes it clear that the described method as well as the described press-hardening tools are suitable for adjusting regions of different strength with a high contrast in the strength.

According to an alternative embodiment of a press-hardening tool, tool surface regions corresponding to regions of lower strength are provided with a thermal insulation insert. Because such mold insert has a substantially lower thermal conductivity, the cooling rate with this press-hardening tool is decelerated for the regions of the molded part having lower strength. In this embodiment, adjustable tool segments are not required, in principle.

The molding surface of a tool segment or of a heat-insulating material insert is typically greater all-round than its corresponding region of the molded part having the lower strength. This is because a certain transition zone exists between adjacent regions of higher strength and those of lower strength.

LIST OF REFERENCE SYMBOLS

1, 1.1, 1.2 Bottom die
2 Molding surface
3, 3.1, 3.2 Molded part
4 Basic tool body
5.1, 5.2, 5.3, 5.4, 5.5, 5.6 Tool segment
6.1, 6.2, 6.3, 6.4 Molding area
7, 7.1 Flange

The invention claimed is:

1. A method for producing a press-hardened formed part with at least two regions having different strengths using a press-hardening tool, the at least two regions including at least one region of lower strength and at least one region of higher strength, with which method a blank preheated to a forming temperature is formed in a forming step and then held in the press-hardening tool in a cooling step for the purpose of heat treating, wherein the at least one region of lower strength is cooled more slowly compared to the at least one region of higher strength, comprising the steps of:

contacting the entire blank on a tool surface for molding during the forming step such that the entire blank is in the press-hardening tool, including the at least one region of lower strength;

after the conclusion of the forming step, withdrawing at least one portion of the tool surface in contact with the formed blank such that the at least one region of lower strength has no contact or reduced contact with the press-hardening tool compared to the at least one region of higher strength during the cooling step;

wherein the at least one portion of the tool surface has at least one tool segment that is adjustable relative to the remaining tool surface;

wherein a surface of the at least one tool segment contacts the at least one region of lower strength during the forming step and then is withdrawn from the at least one region of lower strength for slower cooling of the at least one region of lower strength during the cooling step;

wherein the surface of the at least one tool segment extends farther than the surface of the at least one region of lower strength in a direction of the at least one region of higher strength along the formed blank; and wherein the at least one tool segment is configured to seamlessly abut an adjacent tool segment along the tool surface during the forming step such that the tool surface does not comprise a gap between the at least one tool segment and the adjacent tool segment during the forming step which is then observable as a tool imprint on the formed blank.

2. The method of claim 1, wherein the at least one region of lower strength is in a tool cavity during the cooling step.

3. The method of claim 1, wherein the blank is heated to a uniform forming temperature before the blank is subjected to the forming step.

4. The method of claim 1, wherein the blank is a steel sheet blank and the forming temperature is an austenitizing temperature.

5. The method of claim 1, wherein the at least one region of higher strength comprises more than one region of higher strength, each region of the more than one region of higher strength configured adjacent to the at least one region of lower strength.

6. A press-hardening tool with a molding surface for producing a press-hardened molded part having at least two regions that differ with regard to their strength comprising:
a first die and a second die, each die having a basic tool body and one or more tool segments forming a tool surface,
the basic tool body configured to be cooled,
the one or more tool segments associated with one or more regions of lower strength of the molded part,
the one or more tool segments are retractable relative to the tool surface provided by the basic tool body in a closed position of the press-hardening tool,
the one or the more tool segments have a molding area for a forming process that is larger than the one or more regions of lower strength in a direction of a neighboring region of the molded part with higher strength;
wherein the tool surface of each die does not comprise a gap between the one or more tool segments which is then observable as a tool imprint on the molded part, the one or more tool segments of each die being configured to seamlessly abut an adjacent tool segment of the respective die when contacting the molded part.

7. The press-hardening tool of claim 6, wherein the molding area of the one or more tool segments extends farther in each direction, with respect to the tool surface provided by the one or more tool segments in contact with the molded part at the completion of the forming process, than the one or more regions of lower strength.

8. The press-hardening tool of claim 6, wherein the one or more tool segments are respectively movable inside the press-hardening tool via a sliding motion.

9. The press-hardening tool of claim 6, wherein at least one tool segment of the one or more tool segments of the first die is arranged opposite a corresponding tool segment of the second die with the molded part therebetween.

10. The press-hardening tool of claim 6, wherein the one or more regions of lower strength abuts more than one region of higher strength of the molded part.

11. The press-hardening tool of claim 6, wherein the one or more tool segments are configured to be withdrawn after press-hardening the molded part to produce the one or more regions of lower strength by differential cooling.

* * * * *